US012420598B2

(12) United States Patent
Kuwayama

(10) Patent No.: US 12,420,598 B2
(45) Date of Patent: Sep. 23, 2025

(54) TIRE-WHEEL ASSEMBLY, TIRE, AND WIRELESS POWER RECEIVING SYSTEM

(71) Applicant: BRIDGESTONE CORPORATION, Tokyo (JP)

(72) Inventor: Isao Kuwayama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 330 days.

(21) Appl. No.: 17/629,487

(22) PCT Filed: Jul. 22, 2020

(86) PCT No.: PCT/JP2020/028507
§ 371 (c)(1),
(2) Date: Jan. 24, 2022

(87) PCT Pub. No.: WO2021/015253
PCT Pub. Date: Jan. 28, 2021

(65) Prior Publication Data
US 2022/0314711 A1 Oct. 6, 2022

(30) Foreign Application Priority Data
Jul. 25, 2019 (JP) .................. 2019-137248

(51) Int. Cl.
*B60C 19/08* (2006.01)
*B60L 53/12* (2019.01)
(52) U.S. Cl.
CPC .............. *B60C 19/08* (2013.01); *B60L 53/12* (2019.02); *B60L 2220/46* (2013.01)

(58) Field of Classification Search
CPC ... B60C 19/00; B60C 19/08; B60C 2019/005; B60C 2015/061; B60L 53/12; B60L 2220/46
See application file for complete search history.

(56) References Cited

U.S. PATENT DOCUMENTS 8,008,888 B2 8/2011 Oyobe et al.
8,662,221 B2 3/2014 Ueno et al.
(Continued)

FOREIGN PATENT DOCUMENTS

CN 102092243 A 6/2011
CN 103640439 A 3/2014
(Continued)

OTHER PUBLICATIONS

Oct. 6, 2020, International Search Report issued in the International Patent Application No. PCT/JP2020/028507.
(Continued)

*Primary Examiner* — Justin R Fischer
*Assistant Examiner* — Philip N Schwartz
(74) *Attorney, Agent, or Firm* — KENJA IP LAW PC

(57) ABSTRACT

A tire-wheel assembly includes: a wheel having a rim portion at least part of which is formed of a non-magnetic material; and a tire mounted on the rim portion, in which a tread portion includes a belt formed of a non-magnetic material. The wheel includes, inside the rim portion in a tire radial direction, a container portion that contains a power receiving device that receives electric power supplied wirelessly from outside of the tire in the tire radial direction. The tire includes bead fillers. When BFH represents a radial height of the bead fillers and SH represents a tire cross-sectional height, $0.1 \leq BFH/SH \leq 0.5$ holds true.

13 Claims, 4 Drawing Sheets

(56) References Cited

U.S. PATENT DOCUMENTS

| | | | |
|---|---|---|---|
| 10,207,541 | B2 | 2/2019 | Kuwayama et al. |
| 10,286,797 | B2 | 5/2019 | Klinger et al. |
| 10,328,752 | B2 | 6/2019 | Topin et al. |
| 10,644,544 | B2 | 5/2020 | Kanno |
| 2002/0062890 | A1 | 5/2002 | Masaoka et al. |
| 2002/0112798 | A1 | 8/2002 | Larsen |
| 2005/0006018 | A1 | 1/2005 | Maruoka et al. |
| 2015/0266385 | A1* | 9/2015 | Lang ................ B60L 53/12 320/108 |
| 2016/0236512 | A1* | 8/2016 | Kuwayama ............ B60C 15/04 |
| 2021/0031564 | A1* | 2/2021 | Mizotani ............ B29D 30/1628 |

FOREIGN PATENT DOCUMENTS

| | | | | |
|---|---|---|---|---|
| CN | 103889739 A | | 6/2014 | |
| CN | 102848928 B | | 1/2015 | |
| CN | 105337334 A | | 2/2016 | |
| CN | 106715143 A | | 5/2017 | |
| CN | 108394237 A | * | 8/2018 | ............ B60C 19/00 |
| CN | 108418373 A | * | 8/2018 | ............ H02K 19/12 |
| CN | 109532460 A | | 3/2019 | |
| EP | 0799727 A2 | | 10/1997 | |
| JP | 59153606 A | * | 9/1984 | ........... B60C 9/1821 |
| JP | 59-153606 | * | 9/1987 | |
| JP | H0867115 A | * | 3/1996 | ........... B60C 15/036 |
| JP | H08126106 A | * | 5/1996 | ................ B60L 5/00 |
| JP | 2004242380 A | | 8/2004 | |
| JP | 2007106259 A | | 4/2007 | |
| JP | 2009106136 A | | 5/2009 | |
| JP | 2010041824 A | | 2/2010 | |
| JP | 2011135772 A | | 7/2011 | |
| JP | 2012175869 A | | 9/2012 | |
| JP | 2014195350 A | | 10/2014 | |
| JP | 2018068077 A | | 4/2018 | |
| JP | 2019047691 A | * | 3/2019 | ........... H01L 31/046 |
| KR | 100819343 B1 | * | 4/2008 | ............. C08L 21/00 |
| WO | 0026039 A1 | | 5/2000 | |
| WO | 2013031167 A1 | | 3/2013 | |
| WO | WO-2019111584 A1 | * | 6/2019 | ......... B29D 30/1628 |

OTHER PUBLICATIONS

Jan. 25, 2022, International Preliminary Report on Patentability issued in the International Patent Application No. PCT/JP2020/028507.

Jul. 12, 2023, search result of the Extended European Search Report issued by the European Patent Office in the corresponding European Patent Application No. 20843319.3.

Feb. 24, 2024, search result of Office Action issued by the China National Intellectual Property Administration in the corresponding Chinese Patent Application No. 202080052354.4.

Aug. 13, 2024, search result of Office Action issued by the China National Intellectual Property Administration in the corresponding Chinese Patent Application No. 202080052354.4.

* cited by examiner

TIRE-WHEEL ASSEMBLY, TIRE, AND WIRELESS POWER RECEIVING SYSTEM

TECHNICAL FIELD

The disclosure relates to a tire-wheel assembly, a tire, and a wireless power receiving system.

BACKGROUND

Wireless power supply technology in which a power transmission device installed on a road, a parking space, or the like wirelessly supplies electric power to a power receiving device mounted on a vehicle is known. For example, Patent Literature (PTL) 1 discloses a vehicle equipped with a power receiving device on the underside of the vehicle so that the vehicle can be charged by a power transmission device installed on a road surface.

CITATION LIST

Patent Literature

PTL 1: JP 2018-068077 A

SUMMARY

Technical Problem

However, when the power receiving device installed on the underside of the conventional vehicle described above receives wireless supply of electric power from the power transmission device installed on a road or the like, an obstacle such as a piece of metal or a small animal may enter a space between the power receiving device and the power transmission device, causing eddy currents to be generated around the obstacle. Accordingly, power receiving efficiency could be reduced.

It is an aim of the disclosure to provide a tire-wheel assembly, a tire, and a wireless power receiving system that improve power receiving efficiency in wireless power supply.

Solution to Problem

A tire-wheel assembly according to the disclosure includes: a wheel having a rim portion at least part of which is formed of a non-magnetic material; and a tire mounted on the rim portion, the tire having a tread portion formed of a non-magnetic material. The wheel includes, inside the rim portion in a tire radial direction, a container portion configured to contain a power receiving device configured to receive electric power supplied wirelessly from outside of the tire in the tire radial direction. The tire includes a bead filler. When BFH represents a radial height of the bead filler and SH represents a tire cross-sectional height, $0.1 \leq BFH/SH \leq 0.5$ holds true.

A tire according to the disclosure is the tire used in the above-described tire-wheel assembly, in which the tread portion is formed of the non-magnetic material.

A wireless power receiving system according to the disclosure includes: a power receiving device configured to receive electric power supplied wirelessly; a wheel having a rim portion at least part of which is formed of a non-magnetic material; and a tire mounted on the rim portion, the tire having a tread portion formed of a non-magnetic material. The wheel includes, inside the rim portion in a tire radial direction, a container portion configured to contain the power receiving device. The power receiving device, in a state of being contained in the container portion, receives electric power supplied wirelessly from outside of the tire in the tire radial direction.

Advantageous Effect

According to the disclosure, a tire-wheel assembly, a tire, and a wireless power receiving system that improve power receiving efficiency in wireless power supply can be provided.

DETAILED DESCRIPTION

Figure 1:
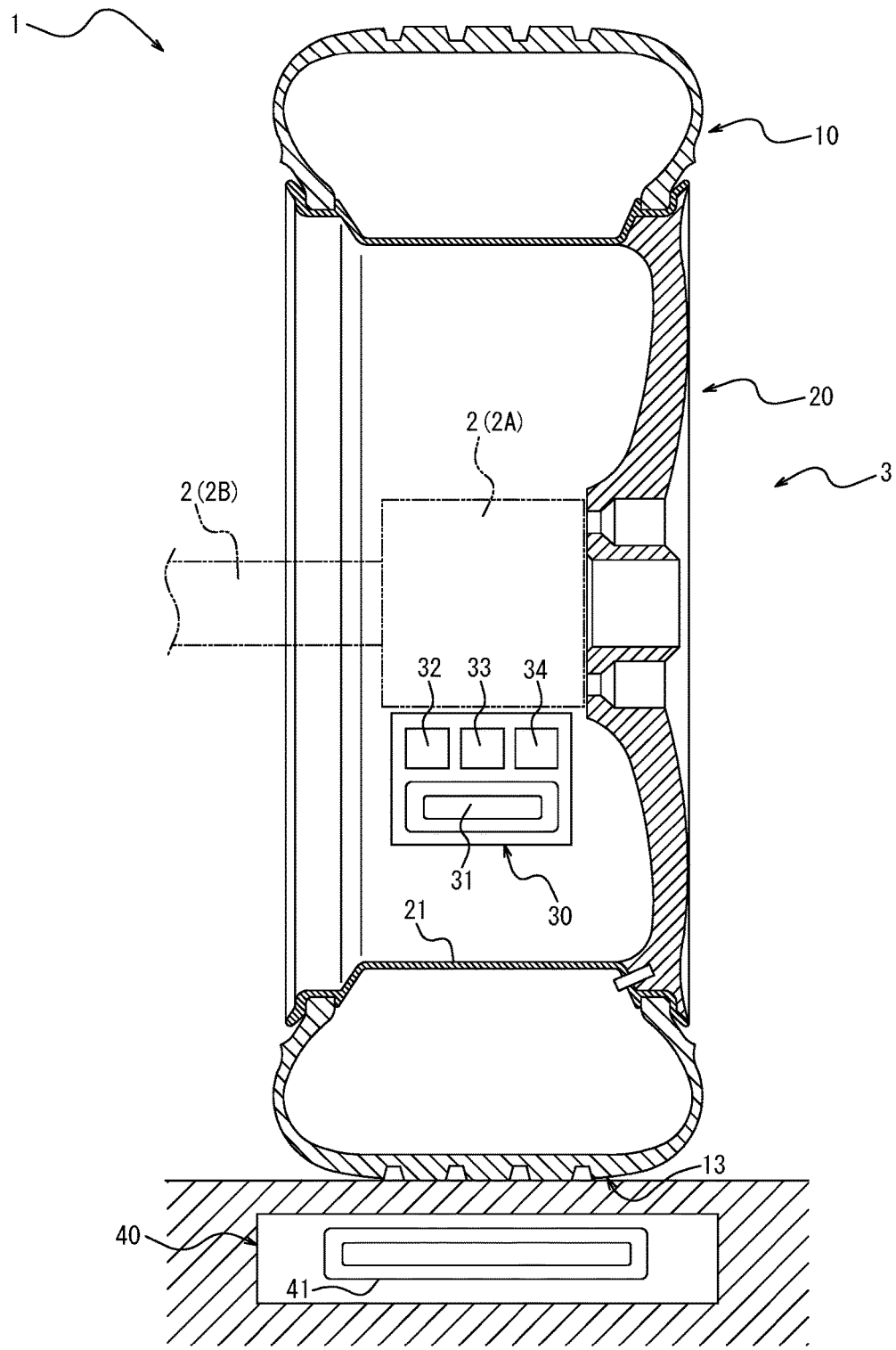
FIG. 1 is a schematic diagram of a wireless power receiving system according to an embodiment of the disclosure, schematically illustrated in a cross-section in a tire width direction.

A tire-wheel assembly, a tire, and a wireless power receiving system according to an embodiment of the disclosure will be described below with reference to the drawings. In each drawing, the same reference numerals are attached to common parts and components.

FIG. 1 illustrates a schematic diagram of a wireless power receiving system 1 according to an embodiment of the disclosure, schematically illustrated in a cross-section in a tire width direction. The wireless power receiving system 1 includes a tire-wheel assembly 3 in which a tire 10 is mounted on a rim portion 21 of a wheel 20, and a power receiving device 30 provided in a vehicle 2 (its entirety is not illustrated) such as an automobile. The power receiving device 30 is provided, for example, at a hub 2A of the vehicle 2. The wheel 20, in a state of being mounted on the hub 2A of the vehicle 2, may contain the power receiving device 30, which is provided in the vehicle 2, inside the rim portion 21 of the wheel 20 in a tire radial direction. The power receiving device 30 receives electric power supplied wirelessly from the outside of the tire 10 in the tire radial direction. In the present embodiment, a power transmission device 40 wirelessly supplies electric power to the power receiving device 30 by generating a magnetic field. More specifically, since the power receiving device 30 is contained in the inside of the rim portion 21 of the wheel 20 in the tire radial direction, the power receiving device 30 can receive electric power from the magnetic field generated approximately vertically upward by the power transmission device 40, by driving the vehicle 2 such that a ground surface of the tire 10 passes over the power transmission device 40 installed on a road or the like, or by stopping the vehicle 2 such that the ground surface of the tire 10 is positioned over the power transmission device 40. At this time, since a tread portion 13 of the tire is in contact with a road surface, it is possible to reduce the risk of an obstacle entering between the power receiving device 30 and the power transmission device 40, thus improving power receiving efficiency of the power receiving device 30 in wireless power supply.

Further, in the tire 10, the tread portion 13 is formed of a non-magnetic material. Also, at least part of the rim portion 21 of the wheel 20 is formed of a non-magnetic material. This prevents the magnetic field generated by the power transmission device 40 from being attenuated before the magnetic field reaches the power receiving device 30, due to the presence of metal such as steel between the power receiving device 30 and the power transmission device 40, while maintaining strength of the tire 10 and the wheel 20. Accordingly, the power receiving efficiency of the power receiving device 30 can be improved in wireless power supply.

The non-magnetic materials include paramagnetic materials and antimagnetic materials having low magnetic permeability. As the non-magnetic materials, resin materials including, for example, plastic resins such as polyester and nylon, thermosetting resins such as a vinyl ester resin and an unsaturated polyester resin, and other synthetic resins may be used. Furthermore, the resin materials may contain fibers such as glass, carbon, graphite, aramid, polyethylene, and ceramic as reinforcing fibers. As the non-magnetic materials, any non-metallic materials including not only resin but also rubber, glass, carbon, graphite, aramid, polyethylene, and ceramic may be used. Furthermore, as the non-magnetic materials, metallic materials including paramagnetic materials such as aluminum or antimagnetic materials such as copper may be used.

The power transmission device 40 is provided with a power transmission coil (primary coil) 41. The power transmission device 40 is installed on the road surface of the road or the like, or is buried so as to be located in the vicinity of the road surface. The power transmission coil 41 generates an alternating current magnetic field based on an alternating current supplied from a power source. The power transmission coil 41 is entirely configured in a ring shape and is disposed so that an axial direction of the ring is approximately perpendicular to the road surface so as to generate the alternating current magnetic field toward an upper part of the road surface. However, in the drawing, the power transmission coil 41 is schematized. The power transmission coil 41 provided in the power transmission device 40 is, for example, wound around a core such as a ferrite core and entirely configured as a ring, but is not limited to this and may be any coil capable of generating an alternating current magnetic field, such as a coil spring or an air-core coil.

In the present embodiment, the power receiving device 30 is provided with a power receiving coil (secondary coil) 31. The power receiving device 30 is, for example, attached to the hub 2A of the vehicle 2, but is not limited to this. The power receiving device 30 may be attached to any position such that, in a state that the wheel 20 is mounted on the hub 2A such as a drive shaft 2B of the vehicle 2, the power receiving device 30 is contained in the inside of the rim portion 21 of the wheel 20 in the tire radial direction. The power receiving coil 31 is entirely configured in a ring shape and is disposed so that an axial direction of the ring is approximately perpendicular to the road surface so as to face the power transmission coil 41, in a state in which the tire-wheel assembly 3 is positioned above the power transmission device 40. Thereby, when the tire 10 is positioned on the road surface above the power transmission coil 41, an electromotive force is generated in the power receiving coil 31 by electromagnetic induction based on the alternating current magnetic field generated by the power transmission coil 41, and an electric current flows through the power receiving coil 31. The power receiving coil 31 provided in the power receiving device 30 is, for example, wound around a core such as a ferrite core and entirely configured in a ring shape, but is not limited to this, and may be any coil capable of generating an electromotive force based on an alternating current magnetic field, such as a coil spring, an air-core coil, or the like.

The power receiving device 30 may further be provided with a power conversion circuit 32, a power storage unit 33, and a control unit 34. The power conversion circuit 32 converts electric power generated in the power receiving coil 31 into direct current electric power, and supplies the direct current electric power to the power storage unit 33 or to other on-board devices provided in the vehicle 2 via conductive wires or the like. The power storage unit 33 stores the electric power generated in the power receiving coil 31. The power storage unit 33 is, for example, a capacitor, but is not limited to this, and may be any power storage device such as a storage battery. In a case in which the power storage unit 33 is a capacitor, charging and discharging can be performed in a shorter time than in a storage battery. For this reason, the power storage unit 33 that is a capacitor is advantageous in a situation in which high responsiveness is required, such as storing the electric power generated in the power receiving coil 31 while the vehicle 2 is being driven over the power transmission device 40 provided on the road. The control unit 34 may include one or more processors that provide processing for controlling each function of the power receiving device 30. The control unit 34 may be a general purpose processor such as a central processing unit (CPU) that executes a program that specifies control procedures, or a dedicated processor that specializes in processing each function. The control unit 34 may include any means used to control the power receiving device 30, such as storage means for storing programs and the like, and communication means for establishing wired or wireless communication with external electronic devices.

In FIG. 1, the wireless power receiving system 1 includes one power receiving device 30, but may include any number of power receiving devices. In a case in which the power receiving device 30 is attached to a position that does not rotate with rotation of the tire 10 and the wheel 20, such as, for example, a cover of the hub 2A, only one power receiving device 30 may be installed at a position facing the road surface. In a case in which the power receiving device 30 is attached to a position that simultaneously rotates with rotation of the tire 10 and the wheel 20, such as, for example, the drive shaft 2B, a plurality of power receiving devices 30 may be installed continuously or intermittently in a wheel circumferential direction.

The following is an example of each of a tire and a wheel, which may constitute a tire-wheel assembly according to the embodiment of the disclosure. However, there is no particular limitation in the tire and the wheel, as long as the tread portion 13 of the tire 10 and at least part of the rim portion 21 of the wheel 20, which constitute a main path through which electric power is supplied to the power receiving device 30 contained in the rim portion 21 (in the above-described embodiment, a main path through which the magnetic field i.e., magnetic lines of force pass), are formed of non-magnetic materials.

(Configuration of Tire)

Next, the configuration of an example of a tire in the tire-wheel assembly according to the embodiment of the disclosure will be described in detail.

In the following, unless otherwise specified, the positional relationship of each component shall be measured, in a reference state in which the tire is mounted on the rim portion of the wheel i.e. an applicable rim, filled with a specified internal pressure, and under no load. In a state in which the tire is mounted on the rim portion of the wheel i.e. the applicable rim, filled with the specified internal pressure, and under no load, the width of the ground surface, which is in contact with the road surface, in the tire width direction is referred to as a ground width of the tire, and edges of the ground surface in the tire width direction are referred to as ground edges.

In this specification, the "applicable rim" means a standard rim (Measuring Rim in ETRTO's STANDARDS MANUAL and Design Rim in TRA's YEAR BOOK) in an applicable size as described in or to be described in an industrial standard valid for regions where pneumatic tires are produced and used, such as JATMA YEAR BOOK of the JATMA (The Japan Automobile Tyre Manufacturers Association, Inc.) in Japan, STANDARDS MANUAL of the ETRTO (The European Tyre and Rim Technical Organization) in Europe, YEAR BOOK of TRA (The Tire and Rim Association, Inc.) in the United States, and the like, but in the case of a size not listed in these industrial standards, the "applicable rim" refers to a rim with a width corresponding to a bead width of pneumatic tires. The term "applicable rim" includes current sizes, as well as sizes that may be to be included in the aforementioned industrial standards in the future. An example of a "future listed size" may be a size listed as "FUTURE DEVELOPMENTS" in the 2013 edition of ETRTO.

In this specification, the "specified internal pressure" refers to an air pressure (maximum air pressure) corresponding to a maximum load capacity of a single wheel in the applicable size and ply rating described in the aforementioned JATMA YEAR BOOK or other industrial standards. In the case of sizes not listed in the aforementioned industrial standards, the "specified internal pressure" refers to an air pressure (maximum air pressure) corresponding to a maximum load capacity specified for each vehicle on which the tire is mounted. Also, in this specification, a "maximum load" means a load corresponding to a maximum load capacity in the applicable size tire described in the aforementioned industrial standards, or, in the case of a size not listed in the aforementioned industrial standards, a load corresponding to a maximum load capacity specified for each vehicle on which the tire is mounted.

Figure 2:
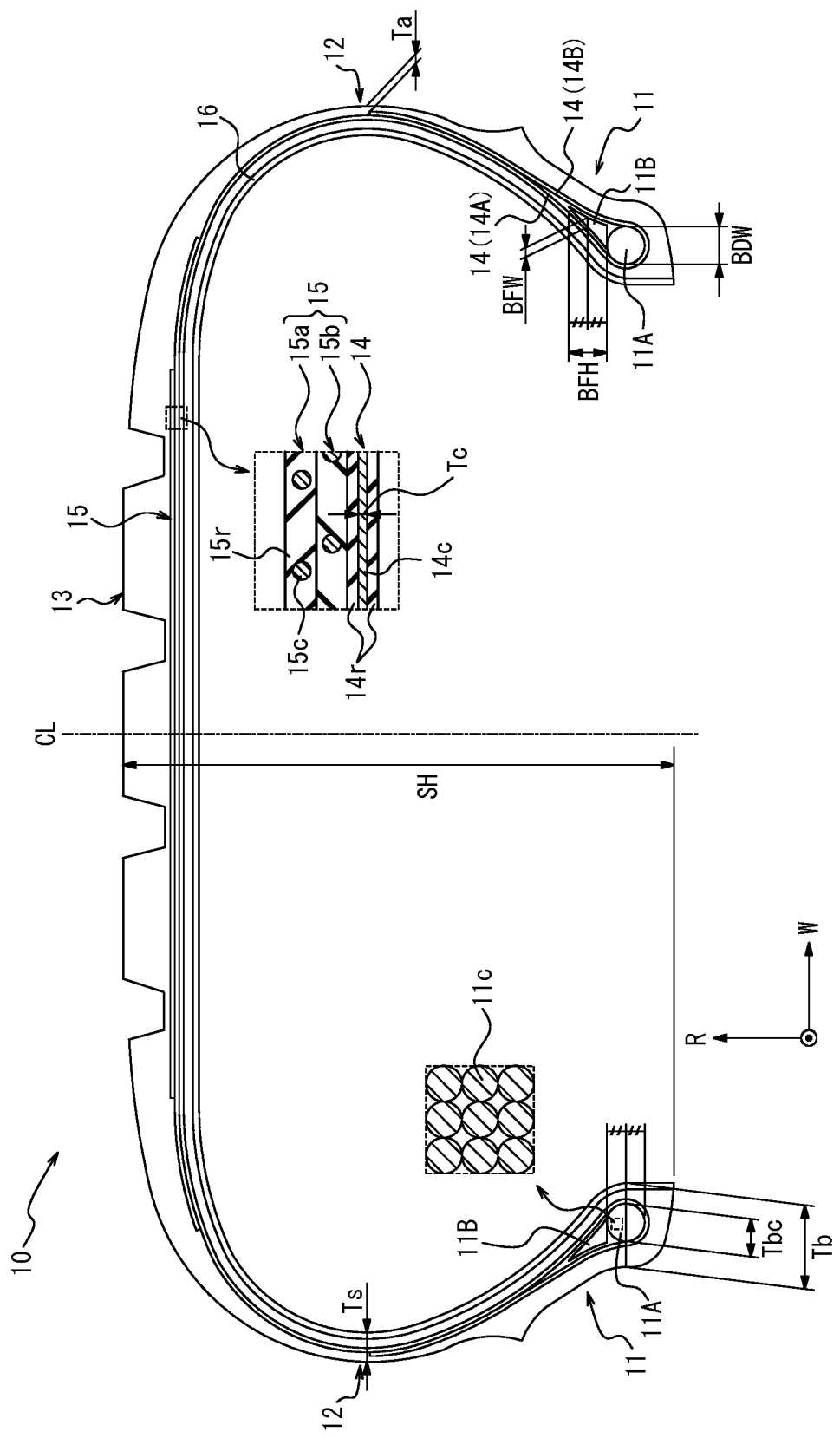
FIG. 2 is a cross-sectional view, in the tire width direction, of an example of a tire in a tire-wheel assembly according to the embodiment of the disclosure.

FIG. 2 is a cross-sectional view of the tire 10 in the tire width direction, in which the tire 10 of the present embodiment is cut along the tire width direction. In this specification, the tire width direction refers to a direction parallel to a rotation axis of the tire 10. In FIG. 2, the tire width direction is indicated by the arrow W. The tire radial direction refers to a direction perpendicular to the rotation axis of the tire 10. In FIG. 2, the tire radial direction is indicated by the arrow R. In the present embodiment, the tire 10 is described as having a symmetrical configuration with respect to an equatorial plane CL of the tire, but is not limited to this, and may have an asymmetrical configuration with respect to the equatorial plane CL of the tire.

In this specification, a side close to the rotation axis of the tire 10 along the tire radial direction is referred to as "inside in the tire radial direction", and a side far from the rotation axis of the tire 10 along the tire radial direction is referred to as "outside in the tire radial direction". On the other hand, a side close to the equatorial plane CL of the tire along the tire width direction is referred to as "inside in the tire width direction", and a side far from the equatorial plane CL of the tire along the tire width direction is referred to as "outside in the tire width direction".

As illustrated in FIG. 2, the tire 10 has a pair of bead portions 11, a pair of sidewall portions 12, and the tread portion 13. The sidewall portions 12 extend between the tread portion 13 and each of the bead portions 11. The sidewall portions 12 are located outside the bead portions 11 in the tire radial direction. In this specification, the tread portion 13 may be a portion between the above-described ground edges.

The pair of bead portions 11 each have a bead core 11A and a bead filler 11B. As illustrated partially enlarged in FIG. 2, the bead core 11A is constituted of a plurality of bead wires 11c the peripheries of which are coated with rubber. The bead wires 11c are formed of steel cords. The bead filers 11B are made of rubber or the like, and are located outside the bead cores 11A in the tire radial direction. In the present embodiment, the thickness of the bead filler 11B decreases toward the outside in the tire radial direction. However, the tire 10 may be structured without the bead fillers 11B. When the tire 10 is mounted on the rim, the bead portions 11 are configured to be in contact with the rim on the inside in the tire radial direction and on the outside in the tire width direction.

The steel cords forming the bead wires 11c may be formed of, for example, steel monofilaments or twisted wires. By forming the bead wires 11c of the steel cords, in a case in which the power receiving device 30 is contained in the inside of the rim portion 21 of the wheel 20 in the tire radial direction, the magnetic field reaching the power receiving device 30 from the power transmission device 40 located outside the tire 10 in the tire radial direction can be less likely to be attenuated by influence of metal and other magnetic fields that are present outside the bead cores 11A in the tire width direction.

However, the bead wires 11c may also be formed of resin cords. By forming the bead wires 11c of the resin cords made of a resin material, in a case in which the power receiving device 30 is contained in the inside of the rim portion 21 of the wheel 20 in the tire radial direction, the magnetic field reaching the power receiving device 30 from the power transmission device 40 located outside the tire 10 in the tire radial direction can be less likely to be attenuated by the bead cores 11A.

The tire 10 has a carcass 14. The carcass 14 extends in a toroidal shape between the pair of bead cores 11A to form a framework of the tire. End portions of the carcass 14 are secured to the bead cores 11A. Specifically, the carcass 14 has a carcass body portion 14A disposed between the bead cores 11A, and carcass folded portions 14B that are folded from the inside in tire width direction to the outside in tire width direction around the bead cores 11A. The lengths of the carcass folded portions 14B may be arbitrary. The carcass 14 may have a structure without the carcass folded portions 14B, or a structure in which the carcass folded portions 14B are wound around the bead cores 11A.

The carcass 14 may be composed of one or more carcass layers (one in FIG. 2). For example, the carcass 14 may be composed of two carcass layers stacked and arranged in the tire radial direction at the equatorial plane CL of the tire. As illustrated partially enlarged in FIG. 2, each carcass layer includes one or more carcass cords 14c and a coating rubber 14r that covers the carcass cords 14c. The carcass cord 14c comprising the carcass layer of the carcass 14 is formed of a non-magnetic material. The carcass cord 14c is made of, for example, polyester, but is not limited to this, and may be made of any resin material such as, for example, nylon, rayon, or aramid, as well as any other non-magnetic material. By forming the carcass cord 14c, constituting the carcass 14, of the non-magnetic material, in a case in which the power receiving device 30 is contained in the inside of the rim portion 21 of the wheel 20 in the tire radial direction, the magnetic field reaching the power receiving device 30 from the power transmission device 40 located outside the tire 10 in the tire radial direction can be prevented from being attenuated by passing through the carcass 14, thus improving power receiving efficiency of the power receiving device 30. In the present embodiment, the carcass 14 has a radial structure, but is not limited to this, and may have a bias structure. The carcass 14 and the carcass layers constituting the carcass 14 may be integrally formed entirely by the above-described resin material or the like, without using the above-described carcass cords 14c.

A belt 15, which reinforces the tread portion 13, and tread rubber are provided in the tread portion 13, outside the carcass 14 in the tire radial direction. The belt 15 may be composed of, for example, one or more (two in FIG. 2) belt layers 15a and 15b laminated in the tire radial direction. As illustrated partially enlarged in FIG. 2, each of the belt layers 15a and 15b includes one or more belt cords 15c and coating rubber 15r covering the belt cords 15c. The belt cords 15c constituting the belt layers 15a and 15b of the belt 15 are formed of a non-magnetic material. The belt cords 15c are made of, for example, polyester, but are not limited to this, and may be made of any resin material such as, for example, nylon, rayon, and aramid, as well as any other non-magnetic material. By forming the belt cords 15c, which constitute the belt 15, of the non-magnetic material, in a case in which the power receiving device 30 is contained in the inside of the rim portion 21 of the wheel 20 in the tire radial direction, the magnetic field reaching the power receiving device 30 from the power transmission device 40 located outside the tire 10 in the tire radial direction can be prevented from being attenuated by passing through the belt 15 in the tread portion 13, thus improving power receiving efficiency of the power receiving device 30. The belt 15 and the belt layers 15a and 15b constituting the belt 15 may be integrally formed entirely by the above-described resin material or the like, without using the above-described belt cords 15c.

The tire 10 has an inner liner 16. The inner liner 16 is arranged so as to cover an inner wall surface of the tire 10. The inner liner 16 may be constituted of a plurality of inner liner layers stacked in the tire radial direction at the equatorial plane CL of the tire. The inner liner 16 is made of, for example, butyl-based rubber having low air permeability. The butyl-based rubber includes, for example, butyl rubber and butyl halide rubber, which is a derivative of butyl rubber. Not limited to the butyl-based rubber, the inner liner 16 may be made of another rubber composition, a resin, or an elastomer.

A material such as rubber and reinforcing rubber comprising the sidewall portions 12 may include a magnetic material, such as ferrite, that has a large magnetic permeability e.g. a ferromagnetic material. This prevents, in a case in which the power receiving device 30 is contained in the inside of the rim portion 21 of the wheel 20 in the tire radial direction, the magnetic field reaching the power receiving device 30 from the power transmission device 40 located outside the tire 10 in the tire radial direction from being attenuated by influence of metal and other magnetic fields that are present outside the sidewall portions 12 in the tire width direction, thus improving power receiving efficiency of the power receiving device 30.

(Configuration of Wheel)

Next, the configuration of an example of the wheel in the tire-wheel assembly according to the embodiment of the disclosure will be described in detail.

Figure 3:
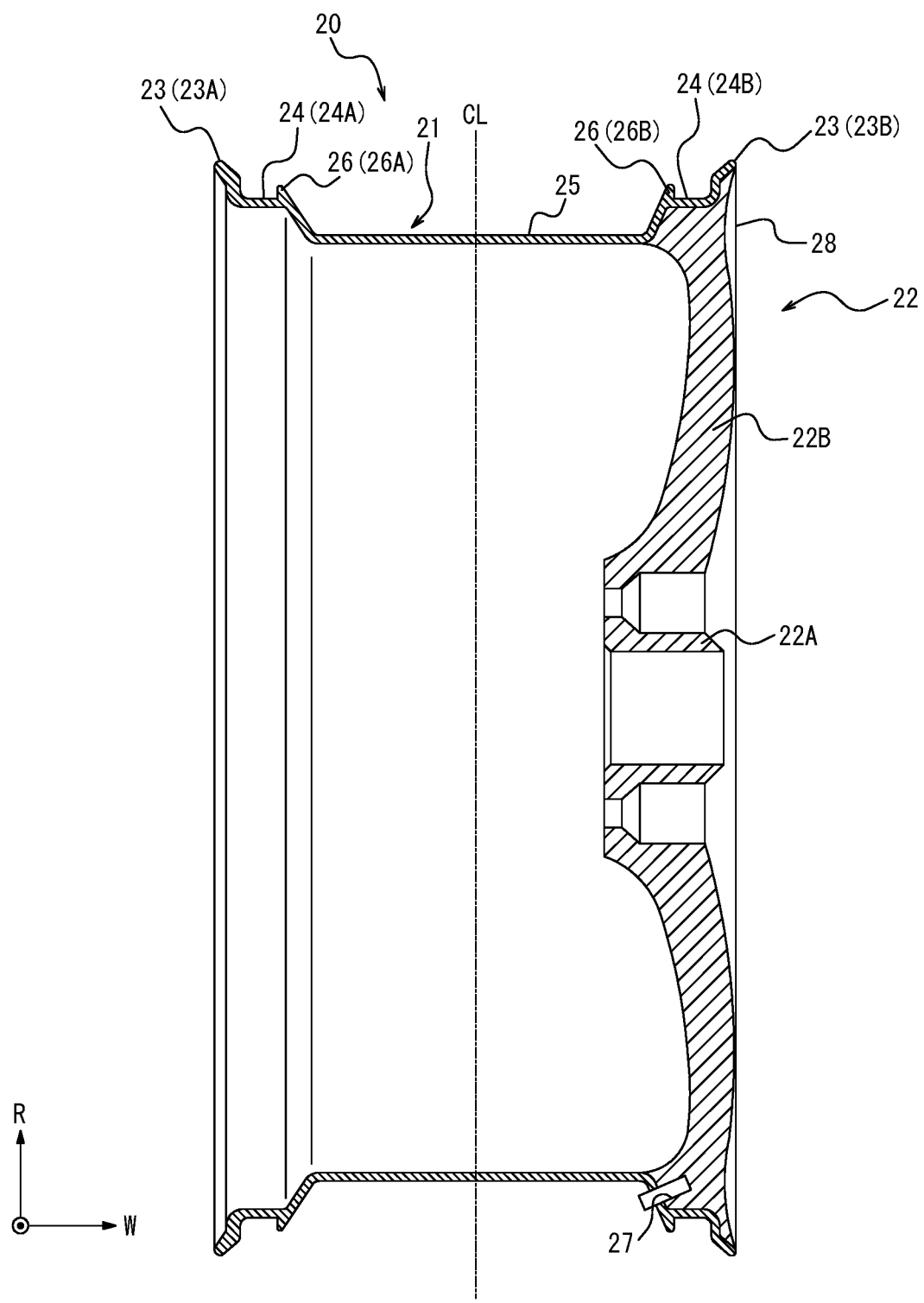
FIG. 3 is a cross-sectional view, in a wheel width direction, of an example of a wheel in the tire-wheel assembly according to the embodiment of the disclosure.

FIG. 3 is a cross-sectional view of the wheel 20 in a wheel width direction, in which the wheel 20 of the present embodiment is cut along the wheel width direction. In this specification, the wheel width direction refers to a direction parallel to a rotation axis of the wheel 20. In FIG. 3, the wheel width direction is indicated by the arrow W. A wheel radial direction refers to a direction perpendicular to the rotation axis of the wheel 20. In FIG. 3, the wheel radial direction is indicated by the arrow R. In a state in which the tire 10 is mounted on the wheel 20, the wheel width direction is parallel to the above-described tire width direction, and the wheel radial direction is parallel to the above-described tire radial direction.

In this specification, a side close to the rotation axis of the wheel 20 along the wheel radial direction is referred to as "inside in the wheel radial direction", and a side far from the rotation axis of the wheel 20 along the wheel radial direction is referred to as "outside in the wheel radial direction". On the other hand, a side close to the equatorial plane CL of the wheel along the wheel width direction is referred to as "inside in the wheel width direction", and a side far from the equatorial plane CL of the wheel along the wheel width direction is referred to as "outside in the wheel width direction".

As illustrated in FIG. 3, the wheel 20 has the cylindrical rim portion 21 and a disk portion 22, which is provided inside the rim portion 21 in the wheel radial direction and is supported and fixed to the hub 2A of the vehicle 2.

The rim portion 21 includes, from the outside in the wheel width direction, a pair of flanges 23 (inner flange 23A and outer flange 23B), a pair of bead seats 24 (inner bead seat 24A and outer bead seat 24B), and a well 25. The bead portions 11 of the tire 10 are mounted on the bead seats 24. The flanges 23 extend from the bead seats 24 outwardly in the wheel radial direction and outwardly in the wheel width direction to support the bead portions 11 of the tire 10 from its sides. The well 25 is concave inwardly in the wheel radial direction between the pair of bead seats 24 to facilitate mounting and demounting of the tire. The well 25 has inclined surfaces that decline inwardly in the wheel width direction, to the inside in the wheel radial direction, from boundaries with the bead seats 24 to a bottom surface of the well 25. Furthermore, the bead seats 24 are provided with a pair of humps 26 (inner hump 26A and outer hump 26B) on the inside in the wheel width direction. The humps 26 protrude outwardly in the wheel radial direction to prevent the beads of the tire from falling into the well 25.

At least part of the rim portion 21 is formed of, for example, the resin material described above, but is not limited to this, and may be formed of any non-magnetic material. This prevents, in a case in which the power receiving device 30 is contained in the inside of the rim portion 21 of the wheel 20 in the wheel radial direction, that is, inside the rim portion 21 of the wheel 20 in the tire radial direction, the magnetic field reaching the power receiving device 30 from the power transmission device 40 located outside the rim portion 21 in the wheel radial direction from being attenuated by passing through the rim portion 21, thus improving power receiving efficiency of the power receiving device 30.

The rim portion 21 of the wheel 20 is further provided with a valve 27 for filling a cavity of the tire 10 with air or other gas, when the tire 10 is mounted. The valve 27 may be made of, for example, the non-magnetic material described above. By making the valve 27 of the non-magnetic material, in a case in which the power receiving device 30 is contained in the inside of the rim portion 21 of the wheel 20 in the wheel radial direction, the magnetic field reaching the power receiving device 30 from the power transmission device 40 located outside the rim portion 21 in the wheel radial direction is prevented from being attenuated by the valve 27, thus improving power receiving efficiency of the power receiving device 30.

However, the entire rim portion 21 does not have to be formed of the non-magnetic material. For example, in a state in which the tire 10 is mounted, a portion inside a portion facing the tread portion 13 of the tire 10 in the tire width direction may be formed of the non-magnetic material, and a portion outside the portion facing the tread portion 13 of the tire 10 in the tire width direction may be formed of a ferromagnetic material such as metal. This allows the power receiving device 30 contained in the wheel 20 to improve the strength of the wheel 20 or to reduce manufacturing cost of the wheel 20, without reducing power receiving efficiency of wireless power supply at the ground surface of the tire 10.

The disk portion 22 has an annular mounting portion 22A constituting a radially inner end portion, and a plurality of spokes 22B extending from the mounting portion 22A outwardly in the wheel radial direction. The mounting portion 22A is a portion coupled to and fixed to the hub 2A of the vehicle 2, and has mounting holes that penetrate in the wheel width direction for inserting bolts or the like for fixing the hub 2A and the mounting portion 22A. Outer end portions of the spokes 22B in the wheel radial direction are integrally coupled to an end portion of an inside surface of the rim portion 21 in the wheel radial direction.

The disk portion 22 may include a magnetic material, such as metal or ferrite, that has a large magnetic permeability e.g. a ferromagnetic material. The inclusion of the magnetic material in the disk portion 22 prevents, in a case in which the power receiving device 30 is contained in the inside of the rim portion 21 of the wheel 20 in the wheel radial direction, the magnetic field reaching the power receiving device 30 from the power transmission device 40 located outside the rim portion 21 in the wheel radial direction from being attenuated by influence of metal and other magnetic fields that are present outside the disk portion 22 in the wheel width direction, thus improving power receiving efficiency of the power receiving device 30. On the other hand, the disk portion 22 may be made of the resin material described above. This makes it possible to reduce the weight of the wheel 20.

The disk portion 22 of the wheel 20 is provided with a wheel cover 28 that covers the outside of the spokes 22B in the wheel width direction. The wheel cover 28 may contain a magnetic material, such as metal or ferrite, that has a large magnetic permeability e.g. a ferromagnetic material. By the wheel cover 28 containing the magnetic material, in a case in which the power receiving device 30 is contained in the inside of the rim portion 21 of the wheel 20 in the wheel radial direction, the magnetic field reaching the power receiving device 30 from the power transmission device 40 located outside the rim portion 21 in the wheel radial direction from being attenuated by influence of metal and other magnetic fields that are present outside the wheel cover 28 in the wheel width direction, thus improving power receiving efficiency of the power receiving device 30.

The wheel 20 can contain, inside the rim portion 21 in the tire radial direction, that is, in a space enclosed by the rim portion 21 and the disk portion 22, the power receiving device 30 that receives electric power supplied wirelessly from the outside of the tire 10 in the tire radial direction. In this specification, the space enclosed by the rim portion 21 and the disk portion 22 is also referred to as a container portion. For example, in a case in which the power receiving device 30 is attached to the hub 2A of the vehicle 2, the power receiving device 30 is contained in the container portion of the wheel 20 by mounting the wheel 20 on the hub 2A of the vehicle 2.

For example, as illustrated in FIG. 1, the power receiving device 30 may be contained in the container portion of the wheel 20 such that the power receiving coil 31 faces the rim portion 21 of the wheel 20, in particular, the well 25 of the rim portion 21. This allows the facing area between the power receiving coil 31 and the power transmission coil 41 of the power transmission device 40 to be increased, when the ground surface of the tire 10 is positioned above the power transmission device 40 provided on the road or the like while the vehicle 2 is being driven.

Figure 4:
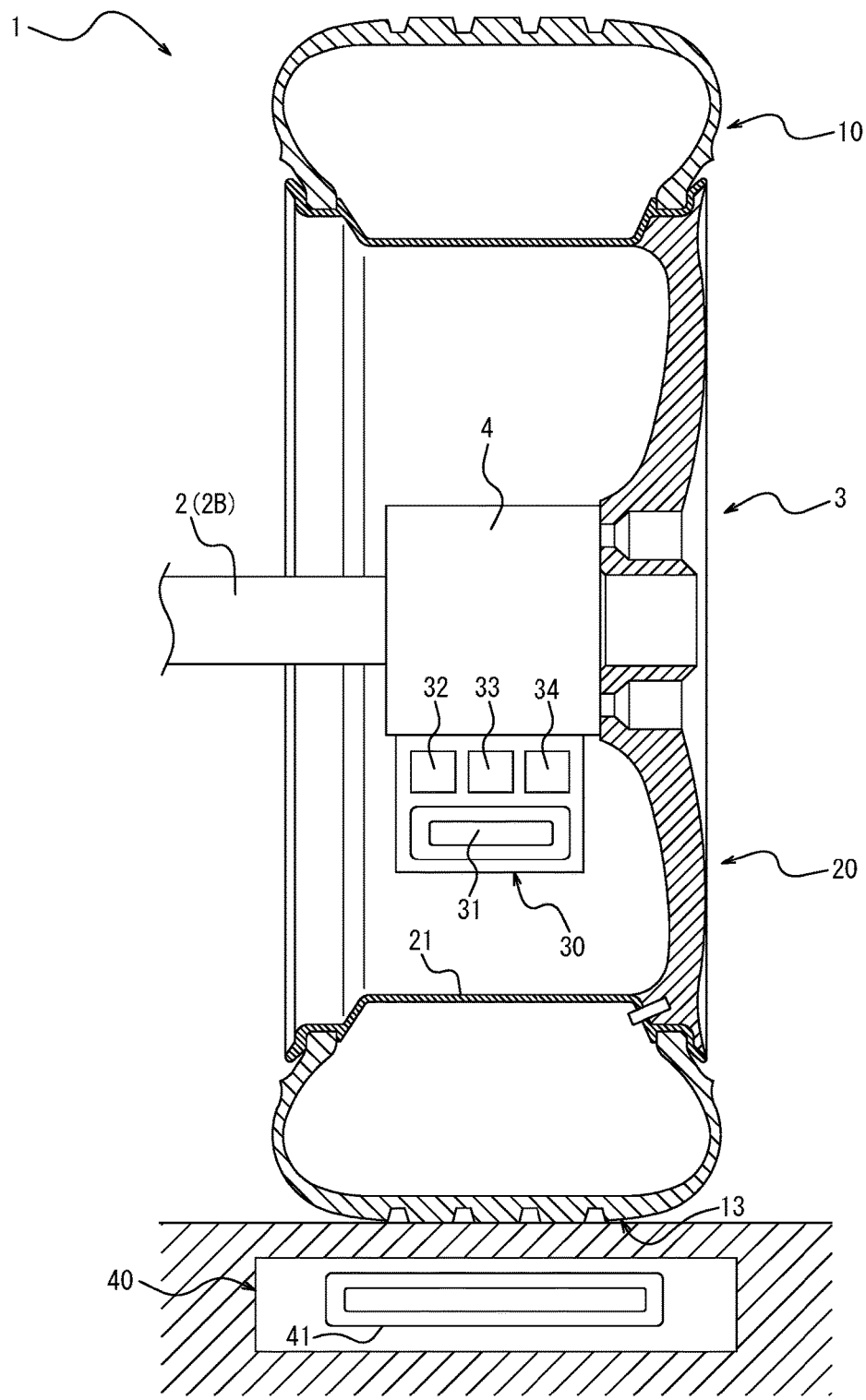
FIG. 4 is a schematic diagram of a variation of the wireless power receiving system according to the embodiment of the disclosure, schematically illustrated in a cross-section in the tire width direction.

A variation of the wireless power receiving system 1 according to the embodiment of the disclosure will be described below. FIG. 4 is a schematic diagram, in which a variation of the wireless power receiving system 1 according to the embodiment of the disclosure is schematically illustrated in a cross-section in the tire width direction. This variation of the wireless power receiving system 1 differs from the wireless power receiving system 1 illustrated in FIG. 1 in that an in-wheel motor 4 is contained in the wheel 20. In this variation of the wireless power receiving system 1, members and components in common with the wireless power receiving system 1 illustrated in FIG. 1 are indicated with the same reference numerals, and their explanation is omitted. The wireless power receiving system 1 includes the tire-wheel assembly 3 having the tire 10 mounted on the rim portion 21 of the wheel 20, and the power receiving device 30 provided in the in-wheel motor 4.

The in-wheel motor 4 is integrated with a hub and is installed in the container portion of the wheel 20 to drive the tire 10 and the wheel 20. In a state in which the in-wheel motor 4 is attached to the wheel 20 as illustrated in FIG. 4, part of the in-wheel motor 4 may be located outside the container portion of the wheel 20 in the tire width direction.

The power receiving device 30 may further be provided with the power conversion circuit 32, the power storage unit 33, and the control unit 34. The power conversion circuit 32 converts electric power generated in the power receiving coil 31 into direct current electric power, and supplies the direct current electric power to the power storage unit 33 or the in-wheel motor 4 via a conductive wire or the like. The power storage unit 33 stores the electric power generated in the power receiving coil 31. The power storage unit 33 is, for example, a capacitor, but is not limited to this, and may be any power storage device such as a storage battery. In a case in which the power storage unit 33 is a capacitor, charging and discharging can be performed in a shorter time than in a storage battery. For this reason, the power storage unit 33 that is a capacitor is advantageous in a situation in which high responsiveness is required, such as storing the electric power generated in the power receiving coil 31 while the vehicle 2 is being driven over the power transmission device 40 provided on the road. The control unit 34 may include one or more processors that provide processing for controlling each function of the power receiving device 30. The control unit 34 may be a general purpose processor such as a central processing unit (CPU) that executes a program that specifies control procedures, or a dedicated processor that specializes in processing each function. The control unit 34 may include any means used to control the power receiving device 30, such as storage means for storing programs and the like, and communication means for establishing wired or wireless communication with external electronic devices.

In this variation, in a state in which the wheel 20 is mounted on the hub of the in-wheel motor 4, the wheel 20 may contain the power receiving device 30, which is provided in the in-wheel motor 4, inside the rim portion 21 of the wheel 20 in the tire radial direction. The in-wheel motor 4 is attached to the drive shaft 2B of the vehicle 2, such as an automobile (its entirety is not illustrated). The power receiving device 30 receives electric power supplied wirelessly from the outside of the tire 10 in the tire radial direction. In the present embodiment, the power transmission device 40 wirelessly supplies electric power to the power receiving device 30 by generating a magnetic field. More specifically, since the power receiving device 30 is contained in the inside of the rim portion 21 of the wheel 20 in the tire radial direction, the power receiving device 30 can receive electric power from the magnetic field generated by the power transmission device 40, by driving the vehicle 2 such that the ground surface of the tire 10 passes over the power transmission device 40 provided on the road or the like, or by stopping the vehicle 2 such that the ground surface of the tire 10 is positioned over the power transmission device 40. The power receiving device 30 supplies the electric power received by wireless power supply to the in-wheel motor 4. At this time, since the tread portion 13 of the tire is in contact with the road surface, it is possible to reduce the risk of an obstacle entering between the power receiving device 30 and the power transmission device 40, thus improving power receiving efficiency of the power receiving device 30 in wireless power supply.

In FIG. 4, the wireless power receiving system 1 includes one power receiving device 30 installed in the in-wheel motor 4 at a position opposite the road surface, but is not limited to this. For example, in a case in which, in the in-wheel motor 4, the power receiving device 30 is attached to a position that does not rotate with rotation of the tire 10 and the wheel 20, only one power receiving device 30 may be installed at a position facing the road surface. In a case in which, in the in-wheel motor 4, the power receiving device 30 is attached to a position that simultaneously rotates with rotation of the tire 10 and the wheel 20, a plurality of power receiving devices 30 may be installed continuously or intermittently in a wheel circumferential direction.

In the disclosure, in a case in which the cross-sectional width SW of the tire 10 is less than 165 (mm), the ratio SW/OD between the cross-sectional width SW and the outer diameter OD of the tire 10 is preferably 0.26 or less. Also, in the disclosure, in a case in which the cross-sectional width SW of the tire 10 is 165 (mm) or more, the cross-sectional width SW (mm) of the tire 10 and the outer diameter OD (mm) of the tire 10 preferably satisfy the relation expression (1): OD (mm)≥2.135×SW (mm)+282.3 (mm).

By satisfying the above-described ratio SW/OD or the relation expression (1), the cross-sectional width SW of the tire 10 becomes relatively small with respect to the outer diameter OD of the tire 10, thereby reducing air resistance. The narrower cross-sectional width secures vehicle space, and in particular, secures space for installation of drive components in the vicinity of the tire 10 mounted on the vehicle inside of the vehicle.

In addition, by satisfying the above ratio SW/OD or the relation expression (1), the outer diameter of the tire 10 becomes relatively large with respect to the cross-sectional width SW of the tire 10, thereby reducing rolling resistance. The wheel axle becomes higher due to the larger diameter of the tire 10, thereby expanding space under a floor. Thereby it is possible to secure space for a trunk or the like of the vehicle 2 and space for installation of drive components.

As described above, by satisfying the above ratio SW/OD or the relation expression (1), low fuel consumption can be achieved for the electrical energy supplied, and large vehicle space can also be secured.

In the disclosure, it is preferable that the cross-sectional width SW (mm) of the tire 10 and the outer diameter OD (mm) of the tire 10 satisfy the relation expression (2): OD (mm)≥−0.0187×SW (mm)$^2$+9.15×SW (mm)−380 (mm).

By satisfying the above relation (2), the cross-sectional width SW of the tire 10 becomes relatively small with respect to the outer diameter OD of the tire 10, thereby reducing air resistance. The narrower cross-sectional width secures vehicle space, and in particular, secures space for installation of drive components in the vicinity of the tire 10 mounted on the vehicle inside of the vehicle.

In addition, by satisfying the above relation expression (2), the outer diameter of the tire 10 becomes relatively large with respect to the cross-sectional width SW of the tire 10, thereby reducing rolling resistance. The wheel axle becomes higher due to the larger diameter of the tire 10, thereby expanding space under a floor. Thereby it is possible to secure space for a trunk or the like of the vehicle 2 and space for installation of drive components.

As described above, by satisfying the above relation expression (2), low fuel consumption can be achieved for the electrical energy supplied, and large vehicle space can also be secured.

In the disclosure, it is preferable that the tire 10 satisfies the above ratio SW/OD and/or the relation expression (2), or the above relation expression (1) and/or the relation expression (2).

In each of the above-described examples, it is preferable that, when the internal pressure is 250 kPa or more, the tire 10 satisfies the above ratio SW/OD and/or the relation expression (2), or satisfies the above relation expression (1) and/or the relation expression (2).

In each of the above-described examples, the tire 10 is preferably used with an internal pressure of 250 kPa or more. In this case, it is particularly suitable that, when the internal pressure is 250 kPa or more, the tire 10 satisfies the above ratio SW/OD and/or the relation expression (2), or satisfies the above relation expression (1) and/or the relation expression (2). As a result, both the tire rolling resistance and the tire weight can be reduced. Therefore, it is possible to suitably achieve both high power supply efficiency and low fuel consumption.

In each of the above-described examples, the tire 10 is suitable in which the cross-sectional area of the bead filler 11B in the tire width direction (the cross-sectional area of the bead filler 11B in the cross-section illustrated in FIG. 2) is one or more and eight or less times the cross-sectional area of the bead core 11A in the tire width direction (the cross-sectional area of the bead core 11A in the cross-section illustrated in FIG. 2). This suitably achieves both high power supply efficiency and low fuel consumption.

In the case of a sandwiched bead core structure that holds the carcass from the inside and outside in the tire width direction, the total area of the bead core in the inside and outside of the carcass in the width direction is referred to as the cross-sectional area of the bead core in the tire width direction.

By setting the cross-sectional area of the bead filler 11B in the tire width direction in the above range, the volume of the bead filler 11B, which is a highly rigid member, can be reduced to reduce the longitudinal spring coefficient of the tire and improve ride comfort. In addition, the bead filler 11B can be made lighter to reduce the weight of the tire 10, and therefore the rolling resistance of the tire 10 can be further reduced.

In particular, in a narrow width and large diameter tire that satisfies the above relation expression (1) or relation expression (2), the tensional rigidity of a belt is high and the tensional rigidity of tire side portions is low in comparison with the belt, so that the effect of reducing the longitudinal spring coefficient, by setting the cross-sectional area of the bead filler 11B in the tire width direction in the predetermined range as described above, is very high.

If the cross-sectional area of the bead filler in the tire width direction is more than eight times the cross-sectional area of the bead core in the tire width direction, the volume of the bead filler, which is a highly rigid member, becomes large, and the longitudinal spring coefficient of the tire is not sufficiently reduced, which may result in a decrease in ride comfort.

On the other hand, if the cross-sectional area of the bead filler in the tire width direction is less than one time the cross-sectional area of the bead core in the tire width direction, the rigidity of the bead portion may be significantly reduced and the lateral spring coefficient may be too reduced to ensure handling stability.

In each of the above examples, when "BFW" (see FIG. 2) represents the width of the bead filler 11B in the tire width direction at a center position in the tire radial direction, and "BDW" (see FIG. 2) represents the maximum width of the bead core 11A in the tire width direction, the tire 10 satisfies:

$$0.1 \leq BFW/BDW \leq 0.6$$

This suitably achieves both high power supply efficiency and low fuel consumption.

By setting the ratio BFW/BDW to 0.6 or less, the volume of the bead filler 11B is reduced while maintaining the height of the bead filler, thereby ensuring rigidity in a tire rotational direction, while reducing the longitudinal spring coefficient. Thereby it is possible to improve ride comfort and reduce the weight of the tire 10.

On the other hand, by setting the ratio BFW/BDW to 0.1 or more, the rigidity of the bead portion 11 can be secured, the lateral spring coefficient can be maintained, and the handling stability can be further secured.

In each of the above examples, when "BFH" (see FIG. 2) represents the height of the bead filler 11B in the tire radial direction, and "SH" (see FIG. 2) represents the tire cross-section height (section height) of the tire 10, the tire 10 satisfies:

$$0.1 \leq BFH/SH \leq 0.5$$

This suitably achieves both high power supply efficiency and low fuel consumption.

By setting the above ratio BFH/SH to 0.5 or less, the radial height of the bead filler 11B, which is a highly rigid member, can be reduced to effectively reduce the longitudinal spring coefficient of the tire 10 and improve ride comfort.

On the other hand, by setting the above ratio BFH/SH to 0.1 or more, the rigidity of the bead portion 11 can be secured, the lateral spring coefficient can be maintained, and the handling stability can be further secured.

Here, the tire cross-sectional height SH shall mean ½ of the difference between the outer diameter of the tire 10 and the rim diameter in a state in which the tire 10 is mounted on the rim, filled with an internal pressure specified for each vehicle in which the tire is mounted, and under no load.

The height BFH (see FIG. 2) of the bead filler 11B in the tire radial direction is preferably 45 mm or less. This suitably achieves both high power supply efficiency and low fuel consumption.

In each of the above-described examples, the tire 10 is suitable in which the ratio Ts/Tb between the gauge Ts (see FIG. 2) of the sidewall portion 12 at a tire maximum width portion and the bead width Tb (the width of the bead portion 11 in the tire width direction, see FIG. 2) of the bead core 11A at a center position in the tire radial direction is 15% or more and 60% or less. This suitably achieves both high power supply efficiency and low fuel consumption.

The "tire maximum width portion" refers to the maximum width position in the cross-section in the tire width direction, when the tire 10 is mounted on the rim and under no load.

The gauge Ts (see FIG. 2) is the sum of the thicknesses of all the components, including the rubber, reinforcement members, inner liner, and the like.

By setting the ratio Ts/Tb in the above range, rigidity at the tire maximum width portion, where bending deformation is large under a tire load, can be moderately reduced to reduce the longitudinal spring coefficient and improve ride comfort.

That is, if the above ratio Ts/Tb is more than 60%, the gauge Ts (see FIG. 2) of the sidewall portion 12 at the tire maximum width portion becomes larger, and the rigidity of the sidewall portion 12 becomes higher, which may result in a higher longitudinal spring coefficient. On the other hand, if the above ratio Ts/Tb is less than 15%, the lateral spring coefficient may be too low and the handling stability may not be secured.

In each of the above-described examples, the tire 10 preferably has a gauge Ts (see FIG. 2) of the sidewall portion 12 at the tire maximum width portion of 1.5 mm or more. This suitably achieves both high power supply efficiency and low fuel consumption.

By setting the gauge Ts to 1.5 mm or more, rigidity at the tire maximum width portion can be maintained as appropriate to suppress reduction in the lateral spring coefficient and to further ensure handling stability.

In each of the above-described examples, the tire 10 preferably has a diameter Tbc of the bead core 11A (the maximum width of the bead core in the tire width direction in this example, see FIG. 2) of 3 mm or more and 16 mm or less. This suitably achieves both high power supply efficiency and low fuel consumption.

By setting the diameter Tbc to 3 mm or more, bending rigidity and torsional rigidity on the flange 23 (see FIG. 3) of the rim can be secured, while weight reduction can be achieved. On the other hand, by setting the diameter Tbc to 16 mm or less, handling stability can be secured, while weight increase can be suppressed.

In the case of a structure in which the bead core 11A is divided into a plurality of small bead cores by the carcass 14, Tbc should be the distance between an innermost end and an outermost end of all the small bead cores in the width direction.

In each of the above-described examples, the tire 10 preferably has a ground contact area of 8000 mm² or more, when the tire 10 is loaded with a maximum load specified for each vehicle in which the tire is mounted. This enables both reduction in the rolling resistance of the tire 10 and reduction in the weight of the tire 10, and thus achieves both high power supply efficiency and low fuel consumption. In addition, the tire axial force can be secured to improve the stability and safety of the vehicle.

In each of the above-described examples, the tire 10 preferably has a Young's modulus of the belt cord 15c of 40000 MPa or more. This allows the carcass structure and the belt rigidity to be appropriate and to ensure the strength of the tire 10 that can be used even with high internal pressure. In addition, it is possible to suitably achieve both high power supply efficiency and low fuel consumption.

In each of the above-described examples, the tire 10 preferably has a thickness of the inner liner 16 of 0.6 mm or more. This can suppress air leakage in a high internal pressure state. In addition, it is possible to suitably achieve both high power supply efficiency and low fuel consumption.

In each of the above-described examples, the tire 10 is suitable in which the ratio Ts/Tc between the gauge Ts (see FIG. 2) of the sidewall portions 12 at the tire maximum width portion and the diameter Tc (see FIG. 2) of the carcass cord 14c is 4 or more and 12 or less. This suitably achieves both high power supply efficiency and low fuel consumption.

By setting the ratio Ts/Tc in the above range, the rigidity at the tire maximum width portion, where bending deformation is large under a tire load, can be moderately reduced to reduce the longitudinal spring coefficient and improve ride comfort.

In other words, if the above ratio Ts/Tc is more than 12, the gauge Ts (see FIG. 2) of the sidewall portion 12 at the tire maximum width portion becomes large and the rigidity of this portion becomes high, which may result in a high longitudinal spring coefficient. On the other hand, if the above ratio Ts/Tc is less than 4, the lateral spring coefficient may be too low and the handling stability may not be secured.

In each of the above-described examples, when Ta (see FIG. 2) represents a distance from the surface of the carcass cord 14c to the outer surface of the tire in the tire width direction at the tire maximum width portion of the tire 10, it is preferable that the ratio Ta/Tc between the distance Ta and the diameter Tc (see FIG. 2) of the carcass cord 14c is 2 or more and 8 or less. This suitably achieves both high power supply efficiency and low fuel consumption.

By setting the above ratio Ta/Tc to 8 or less, the gauge Ts (see FIG. 2) of the sidewall portion 12 at the tire maximum width portion can be made small to reduce the rigidity of the sidewall portion 12, thereby reducing the longitudinal spring coefficient and further improving ride comfort. On the other hand, by setting the above ratio Ta/Tc to 2 or more, the lateral spring coefficient can be secured and the handling stability can be secured more.

Note that, "Ta" (see FIG. 2) refers to the distance from the surface of the outermost carcass cord 14c to the outer surface of the tire in the tire width direction at the tire maximum width portion.

That is, in a case in which the carcass folded portion 14B extends to the outside of the tire maximum width portion in the radial direction, Ta represents the distance from the surface of the carcass cord 14c at the portion forming the carcass folded portion 14B to the outer surface of the tire in the tire width direction.

In each of the above-described examples, the tire 10 preferably has a diameter Tc (see FIG. 2) of the carcass cord 14c of 0.2 mm or more and 1.2 mm or less. This suitably achieves both high power supply efficiency and low fuel consumption.

By setting the above diameter Tc to 1.2 mm or less, the gauge Ts of the sidewall portion 12 relative to the diameter Tc of the carcass cord 14c can be reduced to reduce the longitudinal spring coefficient. On the other hand, by setting the above diameter Tc to 0.2 mm or less, the gauge Ts of the sidewall portion 12 relative to the diameter Tc of the carcass cord 14c can be increased to ensure the handling stability.

As described above, the tire-wheel assembly 3 according to the embodiment of the disclosure includes: the wheel 20 having the rim portion 21 at least part of which is formed of the non-magnetic material; and the tire 10 mounted on the rim portion 21, the tire 10 having the tread portion 13 formed of the non-magnetic material. The wheel 20 has, inside the rim portion 21 in the tire radial direction, the container portion, which contains the power receiving device 30 that receives electric power supplied wirelessly from the outside of the tire 10 in the tire radial direction. According to such a configuration, in a state in which the power receiving device 30 is contained in the container portion of the wheel 20, the power receiving device 30 can efficiently receive the electric power supplied wirelessly from the power transmission device 40 installed on the road or the like. Furthermore, since the power receiving device 30 is contained in the tire-wheel assembly 3 that is in contact with the road surface, it is possible to reduce the risk of an obstacle entering between the power receiving device 30 and the power transmission device 40. Therefore, in the power receiving device 30 contained in the tire-wheel assembly 3, power receiving efficiency in wireless power supply by the electromagnetic induction method or the like is improved.

In the tire-wheel assembly 3 of the embodiment of the disclosure, it is preferable that at least part of the rim portion 21 of the wheel 20 is formed of the non-magnetic material, and the tread portion 13 of the tire 10 is provided with the carcass 14 formed of the resin material and the belt 15 formed of the resin material. According to such a configuration, it is possible to reduce attenuation of a magnetic field generated by the power transmission device 40 that is present outside the tire 10 in the tire radial direction, by passing through the carcass 14, before the magnetic field reaches the power receiving device 30 contained in the tire-wheel assembly 3, and also to reduce the weight of the tire-wheel assembly 3.

In the tire-wheel assembly 3 according to the embodiment of the disclosure, the tire 10 is preferably provided with the pair of bead portions 11 and the pair of sidewall portions 12 extending between the tread portion 13 and each of the bead portions 11. The sidewall portions 12 preferably include the magnetic material. According to such a configuration, in a case in which the power transmission device 40 is a device that generates a magnetic field, it is possible to prevent the magnetic field generated by the power transmission device 40 from being attenuated, before the magnetic field arrives from the outside of the tire 10 in the tire radial direction at the power receiving device 30 contained in the tire-wheel assembly 3, due to influence of metal and other magnetic fields that are present outside the sidewall portions 12 in the tire width direction.

In the tire-wheel assembly 3 according to the embodiment of the disclosure, the wheel 20 is provided with the disk portion 22, and the disk portion 22 preferably contains the magnetic material. According to such a configuration, in a case in which the power transmission device 40 is a device that generates a magnetic field, it is possible to prevent the magnetic field generated by the power transmission device 40 from being attenuated, before the magnetic field arrives from the outside of the wheel 20 in the tire radial direction at the power receiving device 30 contained in the tire-wheel assembly 3, due to influence of metal and other magnetic fields that are present outside the disk portion 22 in the tire width direction.

In the tire-wheel assembly 3 according to the embodiment of the disclosure, the power receiving device 30 preferably receives electric power supplied by the electromagnetic induction method. Since the power receiving device 30 is contained in the tire-wheel assembly 3, the distance between the power receiving device 30 and the power transmission device 40 provided on the road or the like can be made within the range of a distance at which wireless power supply by the electromagnetic induction method can be implemented. According to such a configuration, the electromagnetic induction method, which has a shorter transmission distance but higher transmission efficiency than the electric field coupling method, can be adopted in wireless power supply. This makes it possible to perform wireless power supply with high transmission efficiency.

In the tire-wheel assembly 3 according to the embodiment of the disclosure, the power receiving device 30 preferably supplies the received electric power to the in-wheel motor 4. According to such a configuration, a power transmission path from the power receiving device 30 to the motor can be shortened, and a power loss in the power transmission path can be reduced.

The tire 10 according to the embodiment of the disclosure is a tire, used in the tire-wheel assembly 3 described above. The tread portion 13 is formed of the non-magnetic material. By using the tire 10 according to the above-described configuration, the power receiving device 30 can efficiently receive electric power supplied wirelessly from the power transmission device 40 installed on the road or the like, in a state in which the power receiving device 30 is contained in the tire-wheel assembly 3. Therefore, in the power receiving device 30 contained in the tire-wheel assembly 3, power receiving efficiency in wireless power supply by the electromagnetic induction method or the like is improved.

The wireless power receiving system 1 according to the embodiment of the disclosure includes: the power receiving device 30 that receives electric power supplied wirelessly; the wheel 20 having the rim portion 21 at least part of which is formed of the non-magnetic material; and the tire 10 mounted on the rim portion 21, the tire 10 having the tread portion 13 formed of the non-magnetic material. The wheel 20 is provided with the container portion that contains the power receiving device 30, inside the rim portion 21 in the tire radial direction. The power receiving device 30, in a state of being contained in the container portion, receives electric power supplied wirelessly from the outside of the tire 10 in the tire radial direction. According to such a configuration, the power receiving device 30 can efficiently receive electric power supplied wirelessly from the power transmission device 40 installed on the road or the like, in a state in which the power receiving device 30 is contained in the container portion of the wheel 20. Furthermore, since the power receiving device 30 is contained in the tire-wheel assembly 3 in contact with the road surface, it is possible to reduce the risk of an obstacle entering between the power receiving device 30 and the power transmission device 40. Therefore, in the power receiving device 30 contained in the tire-wheel assembly 3, power receiving efficiency in wireless power supply by the electromagnetic induction method or the like is improved.

Although the disclosure has been described based on the drawings and the embodiment, it is noted that a person skilled in the art can make various variations and modifications based on the disclosure. Accordingly, it is noted that these variations and modifications are included in the scope of the disclosure. For example, the configurations, functions, or the like included in each embodiment or each example can be rearranged so as not to be logically inconsistent. In addition, the configurations, functions, or the like included in each embodiment can be combined with another embodiment or another example, and multiple configurations, functions, or the like can be combined into one, divided, or partly omitted.

For example, in the disclosure, the power receiving device 30 is supplied with electric power wirelessly from the power transmission device 40 by the electromagnetic induction method, but is not limited to this. For example, the power receiving device 30 may be supplied with electric power wirelessly from the power transmission device 40 by any method such as an electric field coupling method.

For example, in the disclosure, the vehicle 2 is described as being an automobile, but is not limited to this. In addition to the automobile such as a passenger car, a truck, a bus, and a motorcycle, the vehicle 2 may be any vehicle that can be moved by means of wheels and tires, including an agricultural vehicle such as a tractor, a construction vehicle such as a dump truck, a bicycle, and a wheelchair.

For example, in the disclosure, the tire 10 is described as being filled with air, but is not limited to this. For example, the tire 10 can be filled with a gas such as nitrogen. Also, for example, the tire 10 may be filled with any fluid, including a liquid, a gel-like substance, or a powder or granular substance, not limited to gas.

For example, in the disclosure, the tire 10 is described as being a tubeless tire equipped with the inner liner 16, but is not limited to this. For example, the tire 10 may be a tube-type tire provided with a tube. Also, for example, the tire 10 may be an airless tire the whole or part of which is formed of the above-described resin material and which is used without being filled with gas.

REFERENCE SIGNS LIST 1 wireless power receiving system
2 vehicle
2A hub
2B drive shaft
3 tire-wheel assembly
4 in-wheel motor
10 tire
11 bead portion
11A bead core
11B bead filler
11c bead wire
12 sidewall portion
13 tread portion
14 carcass
14A carcass body portion
14B carcass folded portion
14c carcass cord
14r coating rubber
15 belt
15a, 15b belt layer
15c belt cord
15r coating rubber
16 inner liner
20 wheel 21 rim portion
22 disk portion
22A mounting portion
22B spoke
23 flange
24 bead seat
25 well
26 hump
27 valve
28 wheel cover
30 power receiving device
31 power receiving coil
32 power conversion circuit
33 power storage unit
34 control unit
40 power transmission device
41 power transmission coil

The invention claimed is:

1. A tire-wheel assembly comprising:
a wheel having a rim portion; and
a tire mounted on the rim portion, the tire having a tread portion formed of a non-magnetic material and sidewall portions including a magnetic material, wherein
the wheel includes, inside the rim portion in a tire radial direction: a power receiving device comprising a power receiving coil configured to receive electric power supplied wirelessly from outside of the tire in the tire radial direction; and a container portion configured to contain the power receiving device,
the tire includes a bead filler,
when BFH represents a radial height of the bead filler and SH represents a tire cross-sectional height, $0.1 \leq BFH/SH \leq 0.5$ holds true,
the rim portion of the wheel comprises; a resin part facing the tread portion of the tire in the tire radial direction and formed of a resin material; and a magnetic part located outside the resin part in a tire width direction and formed of a magnetic material,
the power receiving coil of the power receiving device is configured to face the resin part of the rim portion in the tire radial direction, and
the tire comprises: a carcass including a carcass cord formed of a non-magnetic material; and a belt including a belt cord formed of a non-magnetic material.

2. The tire-wheel assembly according to claim 1, wherein the tread portion of the tire includes a carcass formed of a resin material and a belt formed of a resin material.

3. The tire-wheel assembly according to claim 1, wherein
the wheel includes a disk portion, and
the disk portion contains a magnetic material.

4. The tire-wheel assembly according to claim 1, wherein the power receiving device receives electric power supplied by an electromagnetic induction method.

5. The tire-wheel assembly according to claim 1, wherein the power receiving device supplies the received electric power to an in-wheel motor.

6. The tire-wheel assembly according to claim 2, wherein
the wheel includes a disk portion, and
the disk portion contains a magnetic material.

7. The tire-wheel assembly according to claim 2, wherein the power receiving device receives electric power supplied by an electromagnetic induction method.

8. The tire-wheel assembly according to claim 2, wherein the power receiving device supplies the received electric power to an in-wheel motor.

9. The tire-wheel assembly according to claim 3, wherein the power receiving device receives electric power supplied by an electromagnetic induction method.

10. The tire-wheel assembly according to claim 3, wherein the power receiving device supplies the received electric power to an in-wheel motor.

11. The tire-wheel assembly according to claim 1, wherein the resin part of the rim portion is a well.

12. The tire-wheel assembly according to claim 11, wherein
the rim portion of the wheel further comprises a pair of bead seats, and
the well is concave inwardly in the tire radial direction between the pair of bead seats in the tire width direction.

13. The tire-wheel assembly according to claim 1, wherein
the rim portion of the wheel comprises a pair of bead seats; and a well between the pair of bead seats in the tire width direction,
the well comprises a bottom surface and inclined surfaces, the inclined surfaces declining inwardly in the tire width direction, to the inside in the tire radial direction, from boundaries with the bead seats to the bottom surface, and
the resin part of the rim portion includes at least the bottom surface of the well.

* * * * *